Patented Oct. 29, 1946

2,410,359

UNITED STATES PATENT OFFICE 2,410,359

BONDED REFRACTORY FOR FURNACE LININGS

John Samuel Clifford Perry and Alan Theodore Prince, Kilmar, Quebec, Canada, assignors to Canadian Refractories Limited, Montreal, Quebec, Canada No Drawing. Application November 24, 1944, Serial No. 565,063. In Canada December 2, 1943

10 Claims. (Cl. 106—58)

This invention relates to refractories, and is particularly concerned with the binding together of particles of materials having a high magnesia content, whereby improved properties are imparted.

An object of the invention is to provide an improved method of bonding high magnesia-containing materials in the production without firing of brick and furnace linings.

A further object of the invention is to provide a brick or furnace lining having improved resistance to abrasion and fracture at intermediate temperatures such as 1600 to 2200° F. Metallurgical furnaces operate at high temperatures to which the inside of the furnace lining or wall is subjected, while the outside of the wall is exposed to the lower temperature of the surrounding atmosphere. There is therefore a zone within the furnace wall within which the refractory lining material is subjected to intermediate temperatures. When the furnace is formed from chemically bonded refractory material, it will be appreciated that the character of the chemical bond must be such that the portion of the refractory within such intermediate temperature zone will withstand the stresses tending to disrupt the lining until the ceramic bond has adequately developed under the prevailing temperature conditions.

The problem is to provide bonding materials which will insure adequate strength in the mass of the moulded and bonded magnesia material at such intermediate temperatures, as well as after the ceramic bond has developed, and which at the same time will permit efficient mixing and moulding of the mass. Reactions in the mass of material which cause premature setting of the mixture before moulding are objectionable and should be retarded, since they reduce the strength of the shaped refractory.

Many particular binders used with sulphuric acid for various types of refractory material have been proposed and used. When sulphuric acid is used it is normally incorporated with water and used for gauging the mixture. It is an active reagent which tends to react readily with the material being bonded, heating the mixture, and this increases the rate of the reactions which cause the initial setting of the material to take place before moulding is complete, with the resultant lowering of the strength of the final bonded product. Lack of adequate bonding strength in the material, constituting a furnace lining, may permit a portion to be fractured or broken away, particularly along the zone of intermediate temperatures in the furnace wall, allowing the portion of the lining to fall into the furnace.

The present invention thus contemplates an improved magnesia-containing material to be used directly in furnace linings or in the form of brick and a method of making the same by the use of more effective bonding materials.

It has been found that substantially water-insoluble sulphates are particularly effective as bonding agents for materials having a high magnesia content when used for furnace linings, in the form of brick or as moulded in place in the wall. Insoluble sulphates used in carrying out the invention are those of calcium, strontium, barium, lead and mercury. Barium sulphate is preferred. They are used in finely divided form and are uniformly incorporated throughout the mass to be bonded.

In carrying out the invention clinker or like material having a high magnesia content in appropriate grain sizing is mixed with the bonding material and the mixture is pressed into moulds or rammed into a furnace lining. In mixing the bonding material, including the sulphuric acid, with the refractory particles it is important to prevent the temperaure of the mix from rising unduly due to reactions with the acid. If the mixture becomes too hot the results are not satisfactory. Thus the specific gravity of the sulphuric acid solution used should not be less than 1.10 nor more than 1.30 and is preferably 1.15 to 1.25. The amount of such acid solution used to bring the mixture to moulding consistency may be 5 to 10% of the mix. 7 to 9% is the preferred range of acid solution. 1 to 10% of the substantially insoluble sulphates may be used. The preferred proportion is 4 to 6%.

The following examples are given as illustrations only of the many bonds which may be used in carrying out the invention:

To a magnesia-containing clinker there was added and mixed 5% of barite and 7% of a sulphuric acid solution having a specific gravity of 1.22. This bond provided an efficient moulding mix and insured good resistance to abrasion and high crushing strength in a furnace lining.

Other illustrative bonding agents are: 2% of lead sulphate with 10% of sulphuric acid solution having a specific gravity of 1.20.

1.25% barite, 3.75% lead sulphate gauged with sulphuric acid solution having a specific gravity of 1.20.

5% of anhydrite with 5.5% of sulphuric acid solution having a specific gravity of 1.22.

It will be understood that the refractory to be bonded may contain other than magnesia, provided the latter constitutes the major portion of the material and is used in finely divided form. For example chrome ore may be substituted for a portion of the magnesia-containing clinker, but it is essential that the finest portion of the mixture be the magnesia-containing clinker.

We claim:

1. In the production of refractory furnace linings and brick therefor the method which comprises mixing with a mass of magnesia-containing particles dilute sulphuric acid as gauging liquid and a substantially water-insoluble sulphate and moulding and pressing the mixture into form.

2. In the production of refractory material for furnace linings the method which comprises mixing 1 to 10% of substantially water-insoluble sulphate and, as gauging liquid, surfuric acid having a specific gravity of not more than 1.30 with magnesia containing material.

3. In the production of refractory material for furnace linings the method which comprises mixing with a magnesia containing material sulphuric acid as gauging liquid and an insoluble sulphate of one of a group consisting of calcium, strontium, barium, lead and mercury, moulding and pressing the material into desired form.

4. A method as defined in claim 1 wherein 5 to 10% of aqueous sulphuric acid having a specific gravity of not less than 1.15 nor more than 1.25 is incorporated in the mass.

5. A method as defined in claim 3 wherein 7 to 9% of aqueous sulphuric acid having a specific gravity between 1.10 and 1.30 is incorporated in the mass.

6. In the production of a refractory mass for constituting a furnace lining the method which comprises intimately incorporating with a refractory material having high magnesia content, barite and as gauging liquid aqueous sulphuric acid having a specific gravity of 1.1 to 1.3.

7. A refractory mass for moulding into form for furnace linings comprising magnesia-containing material, a substantially water-insoluble sulphate and as gauging liquid aqueous sulphuric acid.

8. A refractory mass for moulding into form for furnace linings comprising magnesia-containing material, barite and as gauging liquid sulphuric acid.

9. A refractory mixture for moulding into chemically bonded masses for furnace linings comprising magnesia-containing material, sulphuric acid and a sulphate of one of a group consisting of calcium, strontium, barium, lead and mercury, the sulphuric acid having a specific gravity of 1.1 to 1.3 and constituting not more than 10% of the mass.

10. A refractory mixture for moulding into chemically bonded brick comprising magnesia-containing material, sulphuric acid and barite, the sulphuric acid having a specific gravity of 1.1 to 1.3 and constituting not more than 10% of the mass.

JOHN SAMUEL CLIFFORD PERRY.
ALAN THEODORE PRINCE.